Dec. 5, 1961 J. BAUDE 3,012,188

MAGNETIC AMPLIFIER DOUBLE DIODE CONTROLLED SIGNAL WINDING

Filed May 14, 1958

Inventor
John Baude
By Warren F. B. Lindsley
Attorney

United States Patent Office
3,012,188
Patented Dec. 5, 1961

3,012,188
MAGNETIC AMPLIFIER DOUBLE DIODE CONTROLLED SIGNAL WINDING

John Baude, Milwaukee, Wis., assignor to Allis-Chalmers Manufacturing Company, Milwaukee, Wis.
Filed May 14, 1958, Ser. No. 735,207
7 Claims. (Cl. 323—89)

Figure 1:
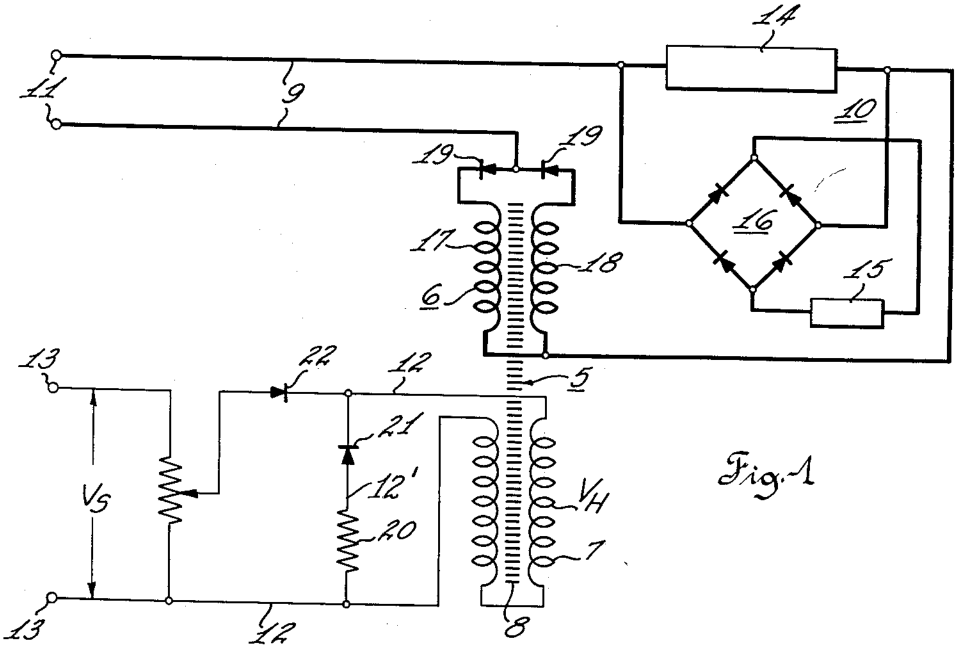

This invention relates to power transmission systems and more particularly to saturable reactor circuits.

The saturation and output of reactors in self-saturating reactor circuits may be controlled by applying to a control winding on the reactor alternating current signals. In self-saturating reactor circuits the reactance winding of the reactor is connected in series with a rectifier between the alternating voltage power supply input and the output circuit of the amplifier thereby allowing only intermittent pulses of unidirectional current to flow in the reactance winding and producing substantially unidirectional M.M.F. resulting in what is known as self-saturation. For purposes of amplifier control one or more control signal windings may be used on the reactor core.

Heretofore magnetic amplifier's static transfer characteristics have been used for purposes of control signal amplification. Its time constant was kept small in order to make the phase angle between the control signal current variations and the gate current modulation as small as possible. The magnetic amplifier's dynamic characteristics also may be employed for control purposes. In this case, the amplifier is purposely designed with a large time constant. The ratio of the square of the control winding turns to control circuit resistance in such an amplifier is relatively large. Its sensitivity to the usual causes for drift is less than the high speed statically controlled amplifier because its control performance is based primarily upon dynamic power gain. The dynamic control features of the self-excited amplifier are most apparent in the region of low gate current. The influence of supply voltage variation can be minimized by arranging control requirements in such a manner that the important operating range is located in the low gate current region.

In accordance with the invention claimed the magnetic amplifier's dynamic characteristics as well as its static and dynamic combined characteristics are used for control purposes. The magnetic amplifier comprises a plurality of windings mounted on a core and having a first set of windings electrically connected with an electrically controlled device to a source of power. A control circuit comprising a plurality of control circuit current amplifying devices is electrically connected to a second winding across a source of alternating control current. A shunt circuit including a half wave rectifier is connected across the control winding for allowing induced current flow in the control winding in a direction to generate magnetic effects in the reactor oppositely related to the magnetic effects produced by current flow through the first rectifier. A third half wave rectifier is connected in series with the source of alternating control current and between this source and the shunt circuit for substantially eliminating current flow through the control winding during the negative half cycle of the alternating control current source.

It is, therefore, one object of this invention to provide a new and improved multipurpose relay.

Another object of this invention is to provide a new and improved magnetic amplifier control device.

A further object of this invention is to provide a new and improved alternating current controlled, self-saturating reactor circuit having an improved control characteristic.

Figure 2:
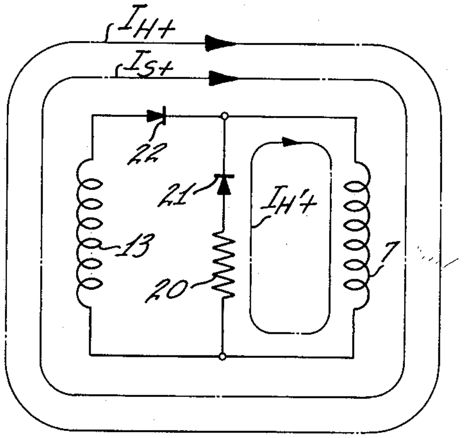

Objects and advantages other than those set forth will be apparent from the following description when read in connection with the accompanying drawing in which:

FIG. 1 is a diagrammatic view of a multipurpose relay employing a magnetic amplifier and embodying the present invention; and FIG. 2 is a diagrammatic illustration of the effects of the rectifiers in series with and across a control winding on the core of the saturable reactor shown in FIG. 1.

Referring more particularly to the drawing by characters of reference, FIG. 1 illustrates diagrammatically a magnetic amplifier control circuit diagram comprising in combination a saturable reactor 5 comprising at least a pair of windings 6 and 7 mounted on a magnetic core 8. Winding 6 is connected in series in an input circuit 9 with an electrically controlled device 10 across a source of commercial electric power 11 such as a sixty cycle system. Winding 7 is connected through a control circuit 12 across a suitable source of alternating control power source 13.

The controlled electric device 10 may comprise either a thermal relay 14 or a magnetic relay 15 or both connected in series with winding 6 across the source of power 11 forming what is generally known as a gate circuit. Relays 14 and 15 have not been shown in detail because they are well known by those skilled in the art. If so desired relay 15 may be connected across a rectifier 16 which is connected in series with winding 6. As noted from FIG. 1 of the drawing, winding 6 comprises a pair of parallelly arranged winding portions 17 and 18 each connected in series with a rectifier such as a diode 19. With the components and arrangement thus described winding 6 will be subjected to cyclic unidirectional current pulses in the conducting direction of the rectifiers 19 when the circuit 9 is energized by alternating current from the supply source 11 thereby generating a pulsed unidirectional M.M.F. tending to saturate core 8 and reduce the impedance of winding 6. The direction or sense of the M.M.F. resulting from current flow through the reactance winding 6 and rectifiers 19 is known as the saturating direction and the M.M.F.'s in that direction are known as saturating M.M.F.'s. The M.M.F.'s in the opposite direction are known as desaturating M.M.F.'s. The saturation level of core 8 and, consequently, the output of the reactor is controlled with the alternating current supplied from source 13 to winding 7 whose phase and amplitude may be adjusted for the desired control.

The unidirectional signal current applied to control winding 7 drives the output of the amplifier downward and toward minimum output. Until minimum output is reached, magnetizing current is derived primarily through the power input circuit 9 from the supply source 11. When the minimum output is reached magnetizing current is equally provided by the unidirectional signal current 13 in the control winding 7 and the power input circuit 9. As the signal current is further increased the voltage across winding 6 induced by signal currents in the control winding 7 will tend to exceed the supply voltage drop across winding 6 and current forced by induced voltage derived from the signal source will flow through the output circuit and into the power supply. This current flow can be only in the conductive direction of rectifiers 19 and thereby increase the flow of current in the load circuit.

In accordance with this disclosure the alternating current controlled self-saturating magnetic amplifier is improved by forming a closed current path 12' including the control winding 7 of the reactor 5 and an effective impedance, for example, resistor 20, in series with a half wave rectifier 21 shunted across winding 7, the rectifier being poled to allow current flow in the proper direction to produce the desired opposition or desaturating M.M.F.'s. In other words, rectifier 21 is so poled that induced circulating current flowing through winding 7 and rectifier 21 will generate M.M.F.'s of opposite sense to M.M.F.'s generated by current through the output winding 6 in the conductive direction of rectifiers 19.

When the control winding 7 is shunted by rectifier 21 and impedance 20 a current resulting from the induced voltage of source 11 in the reactor's control winding 7 will flow through winding 7 in the same direction as current from the alternating current source 13 during each positive half cycle of source 13. As shown in FIG. 2 three current components are active to drive the magnetic amplifier toward cutoff when positive signal voltage of source 13 is applied to the control winding 7. These currents identified in FIG. 2 as $I_{H+}$, $I_{S+}$ and $I_{H'+}$ are respectively the current induced in the control circuit 12 by control winding 7, the current induced in control circuit 12 by the alternating current source 13 and the current induced in the current path 12' by control winding 7. In order to completely eliminate current components from flowing through the control winding when the signal voltage of source 13 reverses its direction a half wave rectifier 22 is connected in series with source 13 and between source 13 and the shunt circuit or path 12'. Rectifier 22 substantially eliminates current flow through winding 7 during the negative half cycle of source 13.

Thus, as obvious from FIG. 2 of the drawing the magnetic amplifier is driven toward cutoff by the aid of the diode or rectifier 21 during the positive half cycle of the signal voltage $V_S$ of source 13 and the induced voltage $V_H$ of winding 7. During the negative half cycle of the voltage of source 13 rectifiers 21 and 22 block substantially all current flowing through winding 7.

Although but one embodiment of the present invention has been illustrated and described, it will be apparent to those skilled in the art that various changes and modifications may be made therein without departing from the spirit of the invention or from the scope of the appended claims.

What is claimed is:

1. In a magnetic amplifier having input and output circuits and a saturable reactor with a reactance winding connected in series with a half wave rectifier between the input and output circuits for self-saturation and with a second winding for connection to a source of alternating control current, the combination therewith of a shunt circuit connected across the second winding and including a second half wave rectifier for allowing induced current flow in the second winding in a direction to generate magnetic effects in the reactor oppositely related to magnetic effects produced by current flow through the first rectifier, and a third half wave rectifier connected in series with said source and between said source and said shunt circuit for substantially eliminating current flow through the second winding during the negative half cycle of said source.

2. In a self-saturating magnetic amplifier, a saturable reactor with a magnetic core and a reactance winding on said core, means including said reactance winding and a half wave rectifier for subjecting the core to substantially unidirectional M.M.F. pulses thereby tending to saturate the core, a source of alternating control current, a second winding on said core connected to said source to receive alternating current therefrom, a circuit including a second half wave rectifier connected across the second winding for passing induced current through the second winding in a direction productive of M.M.F.'s oppositely related to the first said M.M.F.'s, and a third half wave rectifier connected in series with said source and between said source and said circuit for substantially eliminating with said second rectifier current flow through the second winding during the negative half cycle of said source.

3. In a magnetic amplifier having input and output circuits and a saturable reactor with a reactance winding connected in series with a half wave rectifier between the input and output circuits for self-saturation and with a second winding connected to receive alternating current from a source of alternating control current, the combination therewith of an impedance and a second half wave rectifier in series with the impedance, the second rectifier and impedance being shunted across the second winding to provide a path for induced current flow through the second winding in a direction to produce M.M.F.'s in the reactor opposite in sense to the M.M.F.'s produced in response to current flow through the first rectifier, and a third half wave rectifier connected in series with said source and between said source and said path for substantially eliminating with said second rectifier current flow through the second winding during the negative half cycle of said source.

4. In a self-saturating magnetic amplifier, a saturable reactor with a magnetic core and a reactance winding on said core, means including said reactance winding and a half wave rectifier for subjecting the core to substantially unidirectional M.M.F. pulses thereby tending to saturate the core, a second winding on said core, means for supplying alternating control current to the second winding, and a closed current path comprising the second winding and a circuit including an impedance and a second half wave rectifier connected across the second winding, the second half wave rectifier being poled to allow induced current flow in the second winding in a direction to produce M.M.F.'s opposed to the first said M.M.F.'s said windings being conductively isolated from each other, and a third half wave rectifier connected in series with said alternating control current means and between said alternating control current means and said path for substantially eliminating in combination with said second rectifier current flow through the second winding during the negative half cycle of said alternating control current.

5. In a magnetic amplifier, a saturable reactor, means for providing self-saturating M.M.F.'s in said reactor, a control winding on said reactor for connection to a source of alternating control current, and a circuit including an impedance and a half wave rectifier in series with the impedance, said circuit being connected across the control winding to provide a path for induced current flow in the control winding in a direction producing M.M.F.'s opposed to the self-saturating M.M.F.'s, and a second half wave rectifier connected in series with said source and between said source and said circuit for substantially eliminating with said first rectifier current flow through said control winding during the negative half cycle of said source.

6. A magnetic amplifier comprising a source of alternating current, a load circuit, a saturable reactor having a core with a reactance winding, a half wave rectifier connected in series with said winding between said source and said load circuit, a second winding on said core, means for furnishing alternating control current to said second winding, a closed current path including said second winding and a resistor and a second half wave rectifier connected across said second winding, said second rectifier being poled to pass induced current through said second winding in the direction to produce magnetic effects oppositely related to the magnetic effects due to current flow through said first rectifier, and a third half wave rectifier connected in series with said alternating control current means and between said alternating control current means and said closed current path for substantially eliminating current flow through said second winding during the negative half cycle of said alternating control current means.

7. A self-saturating magnetic amplifier comprising a saturable reactor with a magnetic core and a reactance winding on the core, a half wave rectifier in series with the reactance winding for producing self-saturation in the reactor, a second winding on the core and conductively isolated from the reactance winding means for supplying alternating control current to the second winding, and a closed current path comprising the second winding and a circuit including a second half wave rectifier connected across the second winding, said second rectifier being poled to pass induced current through the second winding in the desaturating direction, and a third half wave rectifier connected in series with said means for supplying alternating control current and between said latter means and said path, said third rectifier being poled to pass current through said second winding in the same direction as said second rectifier.

References Cited in the file of this patent

UNITED STATES PATENTS

| | | |
|---|---|---|
| 2,677,099 | Rau | Apr. 27, 1954 |
| 2,719,885 | Ramey | Oct. 4, 1955 |
| 2,752,510 | Hall | June 26, 1956 |
| 2,773,133 | Dunnet | Dec. 4, 1956 |
| 2,780,772 | Lee | Feb. 5, 1957 |
| 2,783,315 | Ramey | Feb. 26, 1957 |
| 2,904,744 | De Lalio | Sept. 15, 1959 |